March 9, 1937.  H. A. SUTTON  2,073,325
SLIDING HOOD
Filed March 30, 1934   3 Sheets-Sheet 1

INVENTOR.
HARRY A. SUTTON.

March 9, 1937. H. A. SUTTON 2,073,325
SLIDING HOOD
Filed March 30, 1934 3 Sheets-Sheet 2
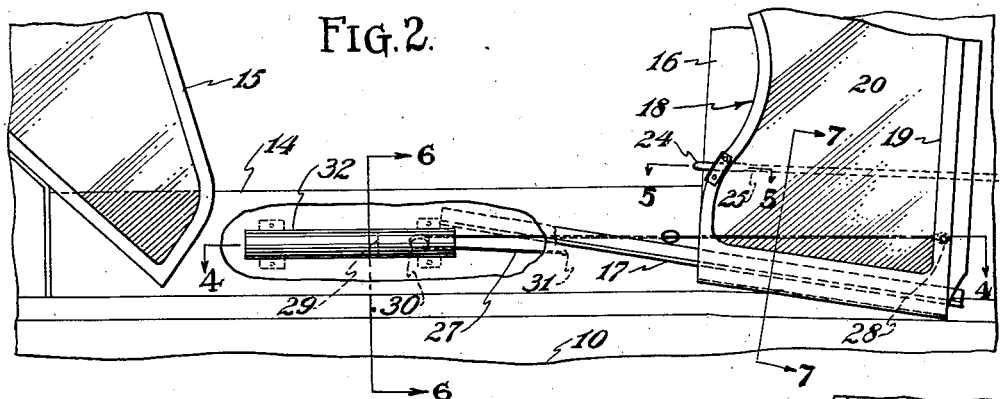
FIG. 2.
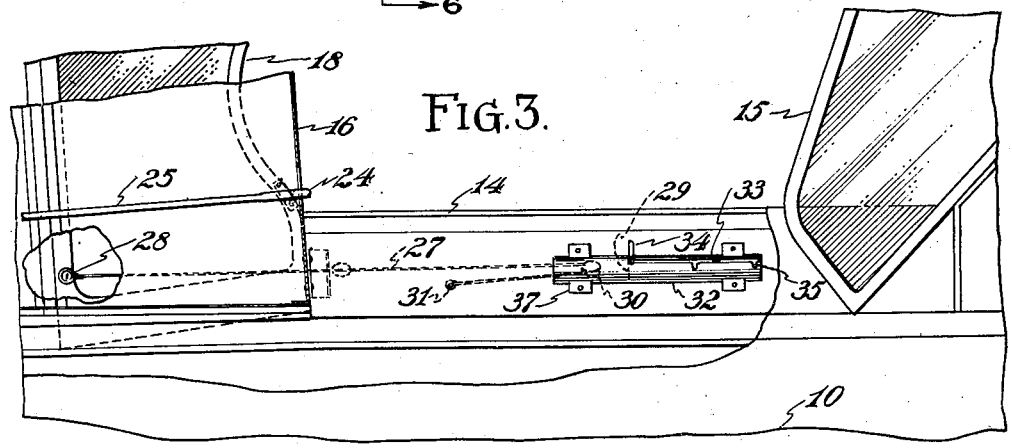
FIG. 3.
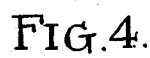
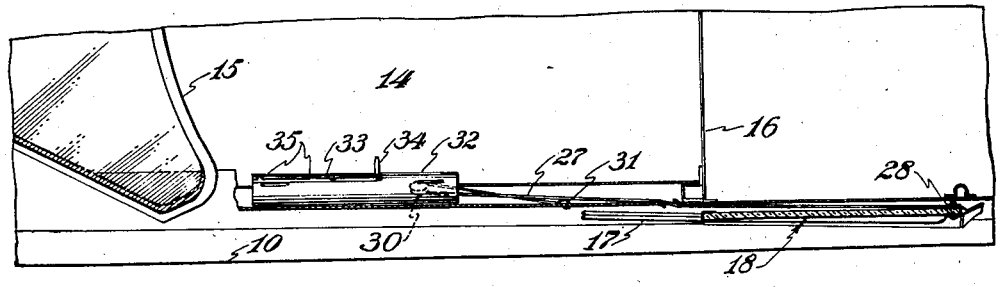
FIG. 4.
FIG. 5.
INVENTOR.
HARRY A. SUTTON.
BY
ATTORNEYS.

March 9, 1937. H. A. SUTTON 2,073,325
SLIDING HOOD
Filed March 30, 1934 3 Sheets-Sheet 3
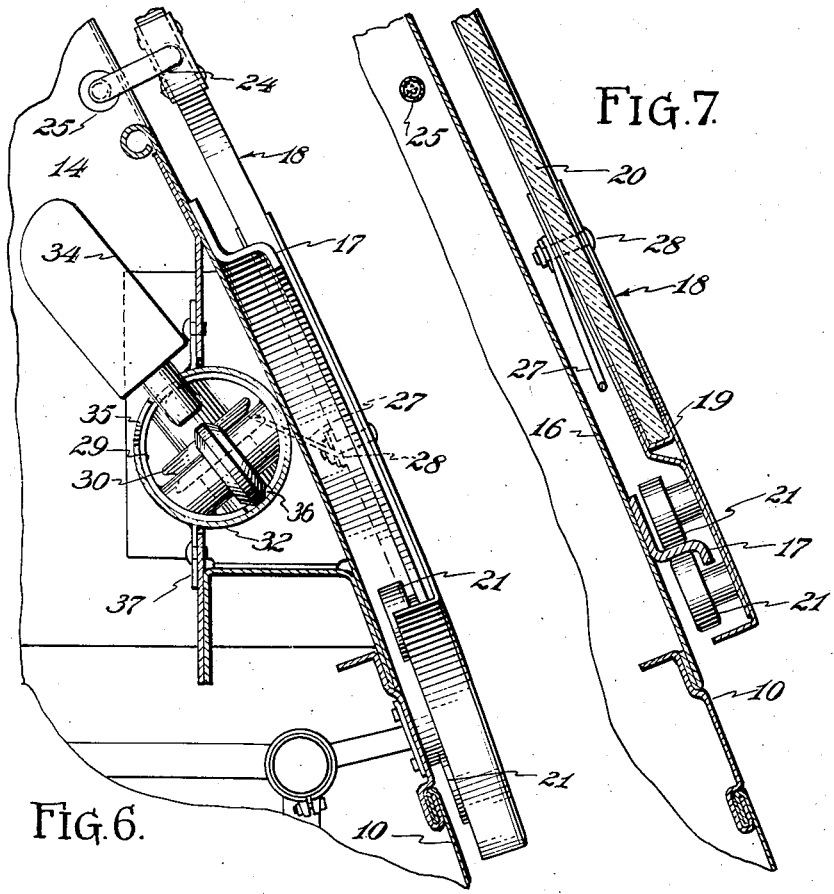
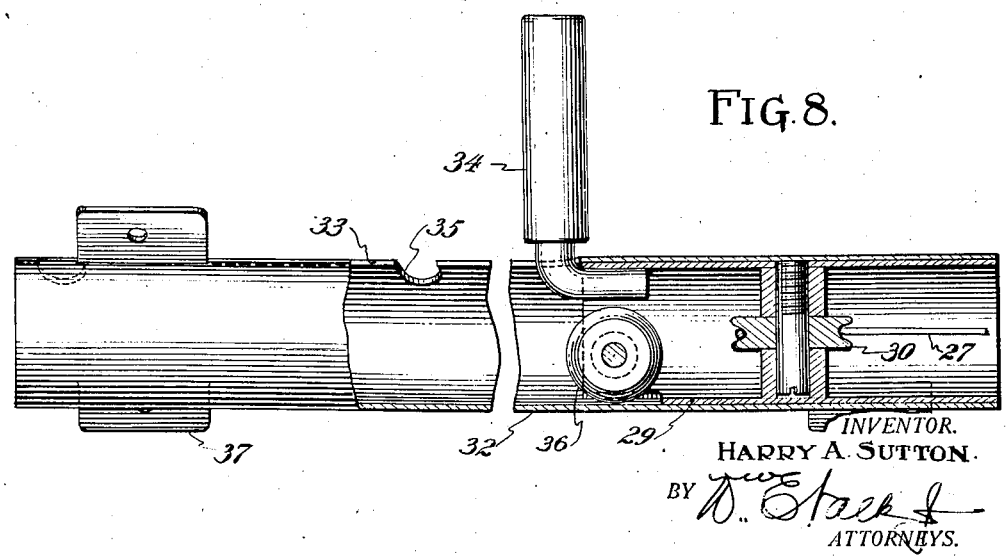
INVENTOR.
HARRY A. SUTTON.
BY
ATTORNEYS.

Patented Mar. 9, 1937

2,073,325

UNITED STATES PATENT OFFICE 2,073,325

SLIDING HOOD

Harry A. Sutton, Buffalo, N. Y., assignor, by mesne assignments, to Curtiss-Wright Corporation, a corporation of New York Application March 30, 1934, Serial No. 718,149

2 Claims. (Cl. 244—121)

This invention relates to aircraft and is particularly concerned with improvements in the cockpit construction of airplanes of the open cockpit type.

Despite the recent trend of airplane construction to cabin types, the open cockpit aircraft has certain advantages for specialized purposes, particularly in military airplanes known as fighters. The open cockpit craft affords a large range of vision for the pilot and particularly enables him to jump clear of the ship quickly in an emergency without the hazard of entanglement with the aircraft should it become disabled. However, as the speeds of aircraft have constantly increased, it has been difficult to arrange the open cockpit so that the pilot is not subjected to side and down drafts of air which converge upon the fuselage aft of the normal forwardly located windshield. In slower craft, the airstream would be deflected by the windshield and would not converge again upon the fuselage until it had reached a point rearward of the cockpit. With higher speed craft, however, the convergence of the airstream is shortened so that the blast of air comes in to strike the top and sides of the pilot's head, and also passes down and around his neck and shoulders. The effect of such wind on the pilot's helmet is to cause it to vibrate or pulsate around the head and ears which, of course, is very annoying and is conducive to headaches. The cold air blast on the neck and shoulders is chilling and uncomfortable and interferes with the efficiency of the pilot. Many attempts have been made to correct the cause of this discomfort. Windshields have been made of numerous sizes and shapes to attempt to avoid quick convergence of the airstream, cockpit openings have been made smaller, and shoulder capes have been snapped to the edges of the cockpit opening. Head rests have been made of various shapes and sizes, all of which may have helped in some measure to avoid the objectionable airstream, but none of which have been entirely satisfactory.

It is an object of this invention, then, to provide a wind screen at the rearward part of an aircraft cockpit, to prevent the convergence of the airblast on the head and shoulders of the pilot, while still leaving the cockpit clear and open.

Another object is to arrange this wind screen in a movable manner so that it may be moved rearwardly to completely uncover the cockpit and to leave the head and shoulders of the pilot exposed at his option, for certain maneuvers of the craft where the wind screen might interfere with his activities.

Still another object is to provide a quick release mechanism to permit the wind screen to move rearwardly, in case it is necessary for the pilot to leave the airplane in an emergency, whereby the wind screen will not interfere with the pilot's egress from the plane.

Still another object is to provide an elastic means which constantly urges the wind screen rearwardly to allow full opening of the cockpit, and to provide an operating member by which the pilot may close the wind screen, such operating member being quickly operable to release the wind screen for rearward movement.

Generally, the invention provides a transparent wind screen arranged to slide forwardly and rearwardly at the rearward edge of the cockpit. The screen in its extreme rearward position completely uncovers the cockpit, while in its forward position approximately the rearward half of the cockpit is covered to prevent wind from striking the pilot's head. An elastic cord attached respectively to the wind screen and to the aircraft, constantly urges the wind screen to a rearward position. A cable device, controlled by an operating bolt within the cockpit, provides means for moving the wind screen from its rearward position to a forward protective position.

Further objects of the invention will be apparent from a reading of the subjoined specification and claims and from an examination of the drawings, in which similar numbers indicate similar parts, and in which:

Fig. 2 is an enlarged fragmentary side elevation from the left side of the airplane, showing certain of the details of construction of the wind screen and its operating mechanism;

Fig. 3 is a view similar to Fig. 2 from the opposite side of the airplane;

Fig. 4 is a section on the line 4—4 of Fig. 2;

Fig. 5 is a section on the line 5—5 of Fig. 2;

Fig. 6 is an enlarged section on the line 6—6 of Fig. 2;

Fig. 7 is an enlarged section on the line 7—7 of Fig. 2;

Fig. 8 is a partial section of the operating bolt for the wind screen; and

Fig. 9 is a fragmentary side elevation of the airplane showing the wind screen in its forward protecting position.

Figure 1:
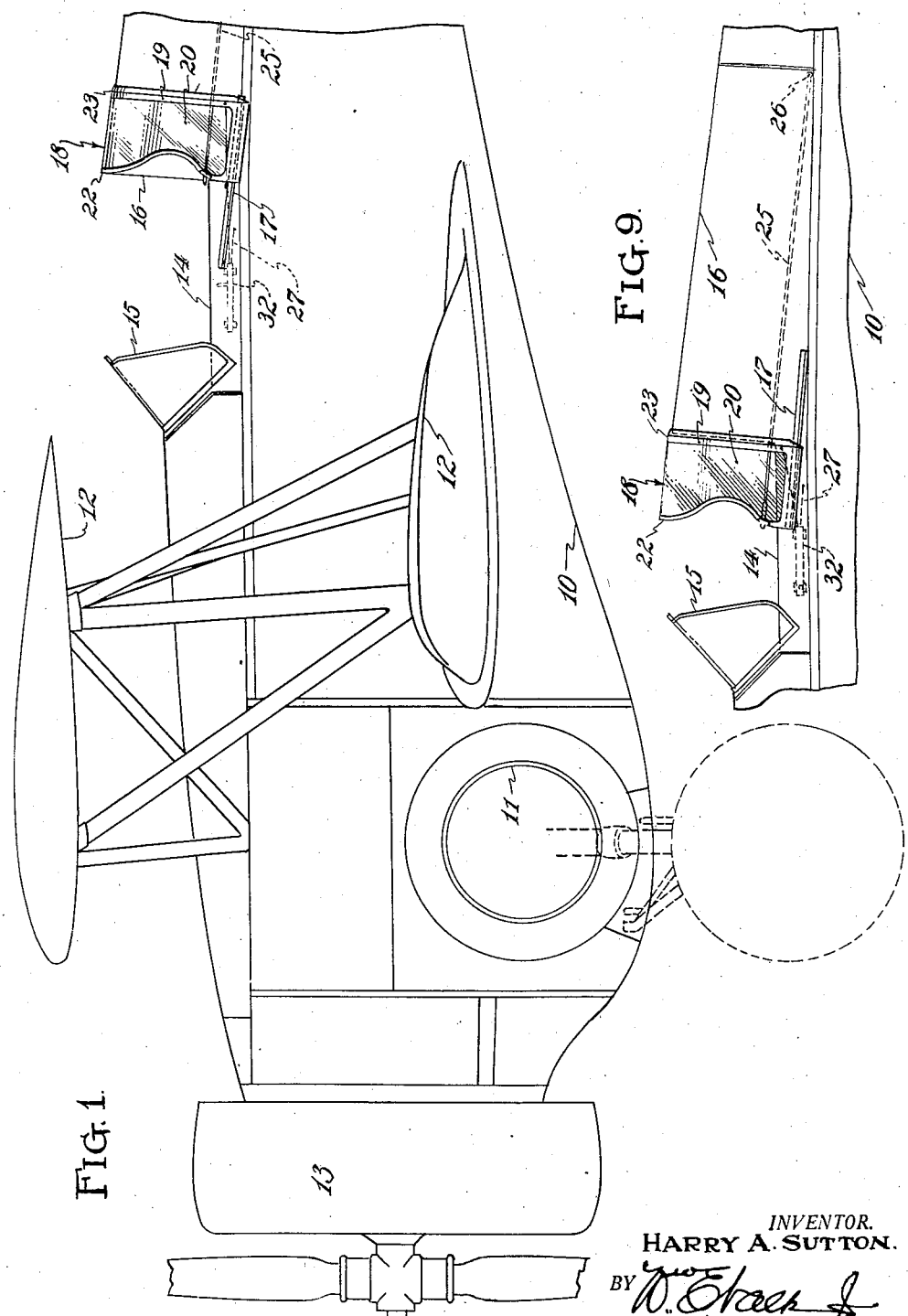
Fig. 1 is a side elevation of the forward portion of an airplane equipped with the wind screen of this invention.

The airplane 10, having the usual landing gear 11 shown as being retractable, and having the usual wings 12 and forwardly located power plant 13, is provided with a cockpit 14 having a windshield 15 at the forward end thereof. Rearward of the cockpit 14, a streamlined head rest 16 is provided, the latter extending rearwardly along the fuselage. Adjacent the rearward edges of the cockpit 14, a pair of opposed tracks 17 are attached, one on each side of the cockpit and slightly inclined with respect to the longitudinal axis of the aircraft. The inclination, however, is such that the tracks are substantially parallel with the upper contour of the head rest 16. A wind screen, which may also be known as a cabin top or cockpit closure, is designated as 18, this screen comprising a framework 19 which supports a transparency 20. As shown best in Fig. 7, the lower edge of the frame 19 carries a plurality of rollers 21 which engage the tracks 17, whereby the screen 18 may be easily moved forwardly or rearwardly along the tracks. The track 17 and the rollers 21 are so arranged that the screen 18 may occupy a rearward position such as that shown in Fig. 1, wherein the forward edge 22 of the screen is substantially flush with the forward edge of the head rest 16. Thereby, the screen proper embraces the head rest. In such position, the screen permits full opening of the cockpit whereby the pilot may enter or leave the cockpit 14 without interference. The screen 18 may be moved forwardly so that the rearward edge 23 thereof is substantially flush with the forward edge of the head rest 16, in which position, the screen forms a protective cover for the head and shoulders of the pilot. To the forward edge of the frame 19, a U-shaped fitting 24 is attached, this fitting having attached thereto an elastic cord 25 which extends rearwardly within the screen and fuselage and is attached to the fuselage at 26, the point 26 being removed by a distance of several feet from the cockpit 14. The cord 25 is installed under tension so that it continually tends to pull the screen 18 to its most rearward position. In order to move the screen to its forward position, a cable 27 is fixed to the screen frame 19 as at 28, this cable extending forwardly to a bolt 29, over a pulley 30 pivotally mounted in the bolt, and thence rearwardly to be attached at a fixed point such as 31 on the inside of the cockpit structure. The bolt 29 is slidably carried in a guide 32, the guide having a longitudinal slot 33 through which a handle 34 fixed to the bolt 29, extends. A plurality of notches 35 are formed adjacent the slot, so that upon traversing the bolt 29 by means of the handle 34, the handle may be pressed downwardly to engage within one of said notches. The notches are so spaced that when the handle 34 is dropped into the forwardmost notch, the cable 27 will have pulled the screen 18 to its forwardmost position. It will be noted as in Fig. 6 that the handle 34 will, when engaged in a notch, occupy a substantially horizontal position. By an upward tap on the handle 34, the latter is disengaged from the notch, whereupon the elastic cord 25 immediately draws the screen rearwardly to a cockpit opening position. The utility of this construction will be appreciated by pointing out that, when in flight, the pilot will have closed the screen to protect his head and shoulders from the windstream. Should an emergency arise whereby it is necessary for him to leave the aircraft, he simply taps the handle 34 upwardly, whereupon he is left with a fully opened cockpit whereby his egress from the aircraft is not hazardous. Likewise, the handle 34 and its associated structure are so organized that there is no chance of their becoming entangled with the clothing or parachute of the pilot.

The cable 27 and the pulley 30, in their organization with the bolt 29, permits the screen to be moved twice as far as a corresponding movement of the bolt 29. For instance, if the screen had a possible fore and aft movement of one foot, it would only be necessary to move the bolt 29 six inches to fully close the screen. Thus, space within the cockpit is conserved.

A roller 36 is pivotally mounted in the bolt 29 to bear against the inner face of the guide 32 whereby the friction of movement of the bolt within the guide is reduced. The guide 32 is provided with brackets 37 for attachment to the fuselage structure.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In operating mechanism for a cabin top for an open cockpit of aircraft, an elastic member attached at its respective ends to the cabin top and to said aircraft for constantly urging said top toward an open position, a sliding bolt mounted within said aircraft, a pulley carried by said bolt, and a cable attached at one end to said cabin top, passing over said pulley and attached at its other end to said aircraft, whereby a sliding of said bolt moves said cabin top substantially twice the distance through which said bolt is moved, toward a position wherein the cabin top closes said cockpit.

2. In a sliding cabin closure operating mechanism for an aircraft fuselage, a guideway in said fuselage having a lock notch, a bolt slidable in said guideway having an element for engagement in said notch, a pulley carried by said bolt, and a cable fixed to said fuselage, extending around said pulley and attached to said cabin closure, whereby sliding of said bolt in said guideway moves said closure a greater distance than the distance through which said bolt is moved.

HARRY A. SUTTON.